United States Patent

Kunde et al.

[11] Patent Number: 5,813,968
[45] Date of Patent: Sep. 29, 1998

[54] PROCESS FOR DISPOSING OF PERLITE WASTE

[75] Inventors: Frank Kunde, Wolfratshausen; Franz Beck, Unterschleissheim, both of Germany

[73] Assignee: Linde Aktiengesellschaft, Hoellriegelskrueth, Germany

[21] Appl. No.: 651,557

[22] Filed: May 22, 1996

[30] Foreign Application Priority Data

May 22, 1995 [DE] Germany ............. 195 18 749.0

[51] Int. Cl.⁶ ................. B09B 1/00; B09B 3/00
[52] U.S. Cl. ............ 588/256; 405/129; 588/252
[58] Field of Search .................. 588/252, 256; 405/128, 129

[56] References Cited

U.S. PATENT DOCUMENTS

| | | | |
|---|---|---|---|
| 4,576,513 | 3/1986 | Lindörfer et al. | 405/128 |
| 4,692,061 | 9/1987 | Lindörfer et al. | 588/252 X |
| 4,741,782 | 5/1988 | Styron | 588/256 X |
| 4,865,761 | 9/1989 | Mandel et al. | 588/252 X |
| 4,913,835 | 4/1990 | Mandel et al. | 588/252 X |
| 5,347,069 | 9/1994 | Sundar | 588/252 |
| 5,434,333 | 7/1995 | Jantzen et al. | 588/256 X |
| 5,476,990 | 12/1995 | Hittner et al. | 588/252 X |

FOREIGN PATENT DOCUMENTS 62-241590 10/1987 Japan .

OTHER PUBLICATIONS

Hausen/Linde, Tieftemperaturtechnik (Cryogenic Technology), Springer–Verlag 1985, chapters 9.5.1 and 9.6.

Primary Examiner—George A. Suchfield
Attorney, Agent, or Firm—Evenson McKeown Edwards & Lenahan, PLLC

[57] ABSTRACT

The present invention relates to a process for disposing of perlite, wherein perlite particles are removed by suction from a source, mixed with water and then compressed, whereby the volume of the perlite is reduced by the compression to about a third or a fifth of its original volume.

17 Claims, 1 Drawing Sheet

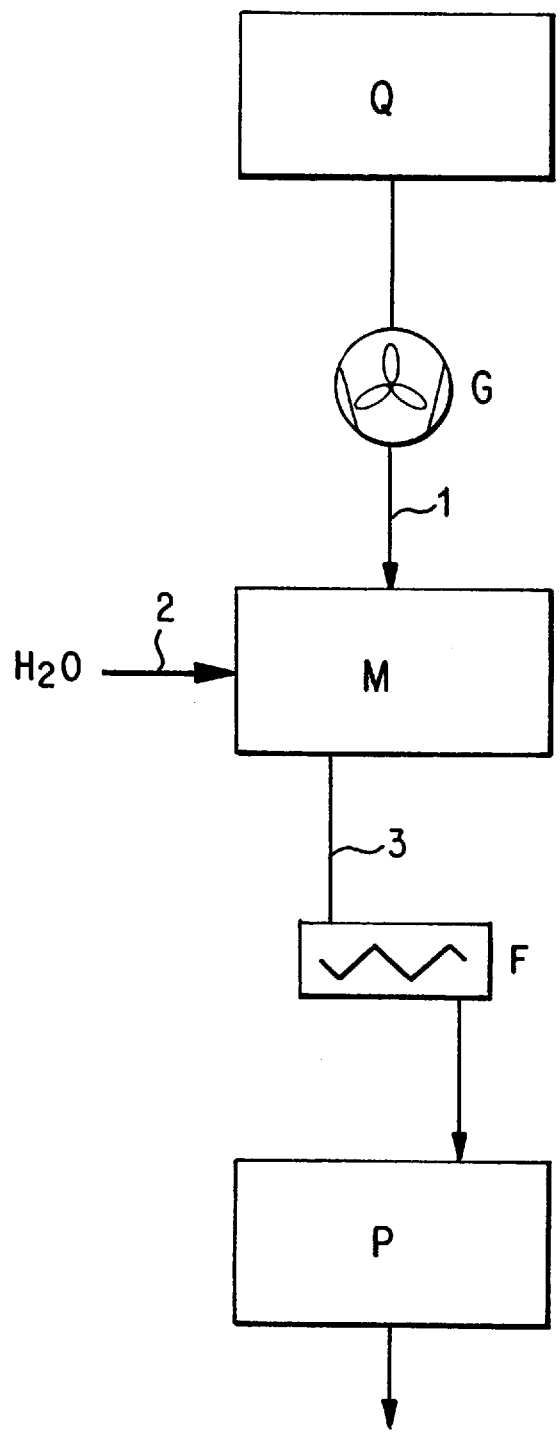

PROCESS FOR DISPOSING OF PERLITE WASTE

BACKGROUND AND SUMMARY OF THE INVENTION

The invention relates to a process for disposing of perlite.

Perlite is formed by the expansion of volcanic rock and in particle form is a highly porous material. It is used mainly for the thermal insulation of equipment, such as tanks for accommodating liquefied, low temperature gases, or entire parts of cryogenic installations. The jacket or casing of such tanks is filled with perlite particles (see Hause/Linde, Tieftemperaturtechnik (Cryogenic Technology), Springer-Verlag 1965, chapters 9.5.1 and 9.6). To dispose of the perlite component, perlite has in the past been filled into sacks and subsequently stored at a suitable landfill.

This known method has the disadvantage that, on the one hand, it is very expensive and therefore cost intensive and, on the other hand, the sacks filled with perlite must be stored as hazardous waste. Furthermore, with a growing concern for the environment, it is constantly becoming more difficult to find landfills which will accept such waste.

It is therefore an object of the present invention to develop a method for disposing of perlite, which is relatively inexpensive and, at the same time, is as compatible as possible with environmental concerns.

This and other objectives are accomplished by mixing the perlite with water and then compressing the mixture. In a preferred embodiment, the water is essentially or completely free of binders. In a further preferred embodiment, the volume of perlite is reduced by the compression to about a third or a fifth of its original volume.

The method according to the present invention for industrial use, is to aspirate the perlite by means of a fan and then to mix the recovered perlite with water. The perlite-water mixture is then brought into a press chamber and pressed into blocks. At this time, the perlite is reduced to about a third to a fifth of its original volume using a pressure of, for example, 20 to 500 bar, preferably of 150 to 200 bar and particularly of about 200 bar, and in the process, the perlite is conditioned to be dust free. As such, it in possible to reduce perlite by using a simple and inexpensive process, into a form which enables it to be stored with relatively less problems at landfills, particularly at landfills usually used for building rubble. The elimination of dust from the compressed perlite, as well as the considerable reduction in volume of the waste, significantly reduces landfill costs.

In preliminary efforts to condition perlite to make it dust-free, the material to be disposed of was mixed with binders such as lime slurry, sulfuric acid and sodium silicate. These efforts resulted in useful but not completely satisfactory results. Within the scope of the present invention, however, it was surprisingly observed that a special binder is not required. Instead, the addition of water with the subsequent pressing is sufficient to realize the desired elimination of dust. In addition, the present invention also achieves the above mentioned reduction in volume.

The size of the blocks depends on the press. In a preferred embodiment, the blocks were pressed in the form of cylinders with a diameter of about 220 mm and a height of about 250 mm.

Other objects, advantages and novel features of the present invention will become apparent from the following detailed description of the invention when considered in conjunction with the accompanying drawings.

BRIEF DESCRIPTION OF THE DRAWINGS

The sole drawing FIGURE is a schematic drawing showing a preferred embodiment for the process of the present invention.

DETAILED DESCRIPTION OF THE PREFERRED EMBODIMENTS

From a source Q of perlite that is to be disposed of, for example, from the vacuum installation of a storage tank or the cold box of a cryogenic installation, perlite is removed by suction by means of a fan G and passed through pipeline 1 to a mixing chamber M. The mixing chamber M is charged with water from pipeline 2. The ratio by weight of water to perlite is in the range of 1:3 to 1:30, preferably 1:10 to 1:15 and particularly about 1:10, According to the present invention, it is not necessary to supply other materials, ouch as binders. On the contrary, according to a preferred embodiment, water with a binder content of less than 1% by weight and particularly completely free of binders is used. For example, untreated industrial water or tap water is suitable according to the process of the present invention.

The perlite-water mixture 3 from the mixing chamber M is subsequently fed with the help of a screw conveyor (F) into a pressing chamber P and pressed into blocks.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for disposing of perlite, comprising the steps of mixing the perlite with water which is essentially free of binders to obtain a perlite-water mixture and compressing the mixture to thereby substantially reduce the volume of the perlite.

2. The process as claimed in claim 1, further comprising the step of aspirating the perlite with a fan to recover the perlite prior to the mixing step.

3. A process for disposing of perlite, comprising the steps of mixing the perlite with water which is essentially free of binders to obtain a perlite-water mixture and compressing the mixture to thereby substantially reduce the volume of the perlite, wherein the compressing step includes feeding the mixture into a pressing chamber and pressing the perlite-water mixture into blocks.

4. The process as claimed in claim 3, wherein the step of feeding the mixture into a pressing chamber includes feeding the mixture to the pressing chamber with a screw conveyor.

5. The process as claimed in claim 3, wherein the step of pressing the mixture into blocks includes pressing the blocks to form cylinders.

6. The process as claimed in claim 5, wherein the cylinders have a diameter of about 220 mm and a height of about 250 mm.

7. The process as claimed in claim 1, wherein the mixing and compressing is controlled to produce a substantially dust-free conditioned perlite.

8. The process as claimed in claim 1, wherein the step of compressing the perlite-water mixture includes reducing the volume of the perlite to a third to a fifth of its original volume.

9. The process as claimed in claim 1, wherein the step of compressing the perlite-water mixture includes compressing at a pressure in the range of 20 to 500 bar.

10. The process as claimed in claim 1, wherein the step of compressing the perlite-water mixture includes compressing at a pressure in the range of 150 to 200 bar.

11. The process as claimed in claim 1, wherein the step of compressing the perlite-water mixture includes compressing at a pressure of about 200 bar.

12. The process as claimed in claim 1, wherein the water contains less than 1% by weight of binders.

13. The process as claimed in claim 1, wherein the water is completely free of binders.

14. The process as claimed in claim 1, wherein the water is untreated industrial water or tap water.

15. The process as claimed in claim 1, wherein the step of mixing the perlite with water includes mixing the perlite with water at a ratio by weight of water to perlite in the range of 1:3 to 1:30.

16. The process as claimed in claim 1, wherein the step of mixing the perlite with water includes mixing the perlite with water at a ratio by weight of water to perlite in the range of 1:10 to 1:15.

17. The process as claimed in claim 1, wherein the step of mixing the perlite with water includes mixing the perlite with water at a ratio by weight of water to perlite of 1:10.

\* \* \* \* \*